April 21, 1942.  L. H. REZOS  2,280,354
BINOCULARS
Filed Sept. 15, 1939  2 Sheets-Sheet 1
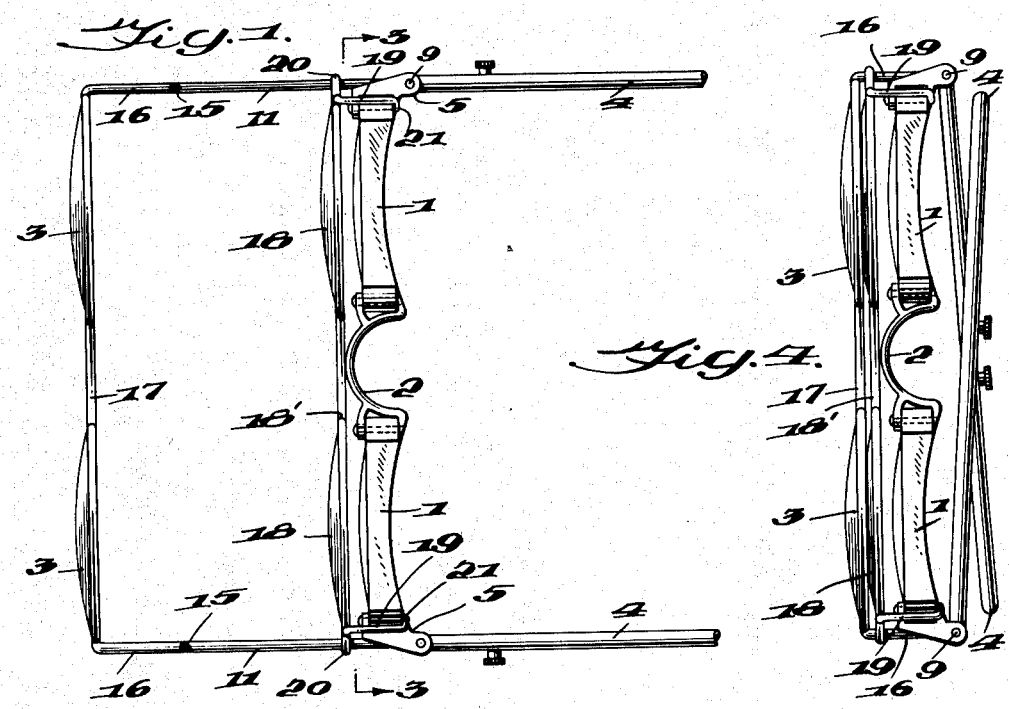
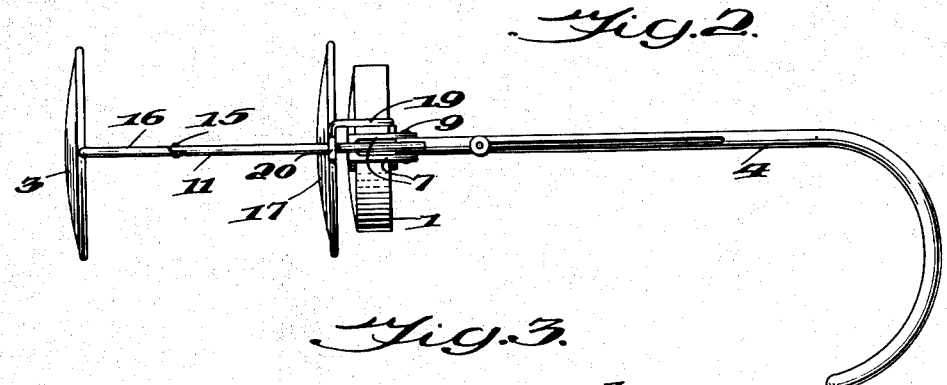
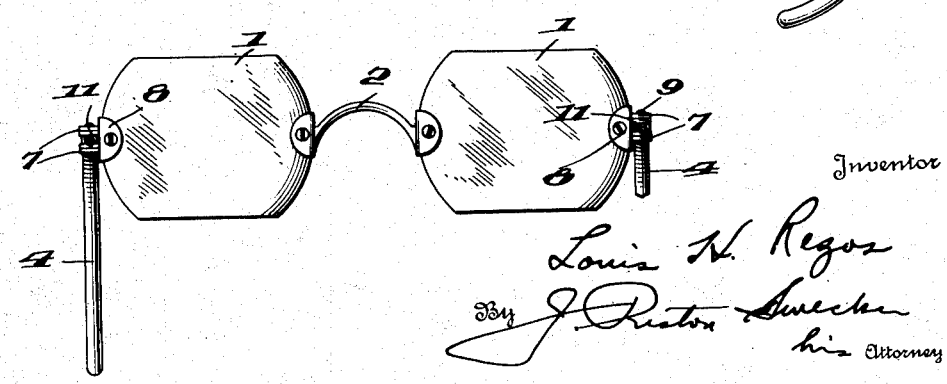

April 21, 1942. L. H. REZOS 2,280,354
BINOCULARS
Filed Sept. 15, 1939 2 Sheets-Sheet 2
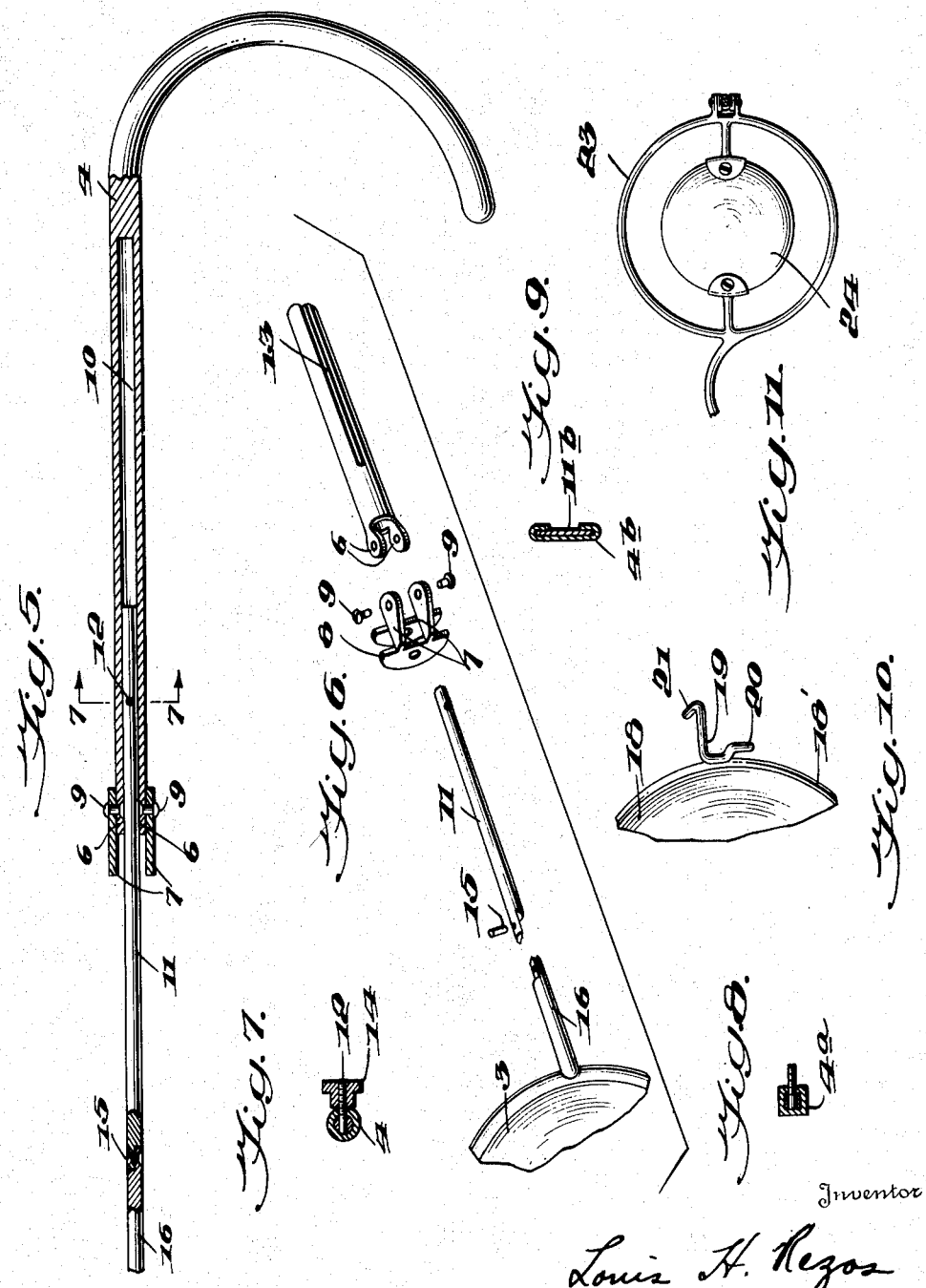
Inventor
Louis H. Rezos
By J. Preston Swecker
his Attorney Patented Apr. 21, 1942

2,280,354

UNITED STATES PATENT OFFICE 2,280,354

BINOCULARS

Louis H. Rezos, Arlington, Va.

Application September 15, 1939, Serial No. 295,145

3 Claims. (Cl. 88—41)

This invention relates to an improvement in universal binoculars of the character designed for adjustment to different focal lengths.

The object of the invention is to make the binoculars applicable for wearing directly on the head for continuous application thereto, particularly when viewing sporting events, such as horse-racing or boxing, and also for viewing moving pictures and other views at a distance which are substantially constant and yet of sufficient distance that use of the binoculars over a considerable period of time would be desirable.

Heretofore, it has been necessary for persons using binoculars or field glasses to hold them to the eyes continuously during the period of viewing the desired scene or object. No satisfactory arrangement has been provided heretofore for securing the binoculars or field glasses to the head of the user in proper position before the eyes for satisfactory use.

This invention has provision for securing the binoculars directly to the head, by the use of temples or other supporting means, whereby the binoculars will be worn continuously when desired for use, and yet may be readily removed. Provision is made for ready adjustment of the focus of the binoculars, and also for collapsing whereby they may be folded up for carrying in the pocket, or extended to the desired degree for using in a simple and effective manner. This is particularly desirable when the binoculars must be brought into use quickly, as for use by policemen for noting license numbers of fleeing vehicles, whereby it is desirable to have the binoculars accessible for immediate use. They are also capable for being used as reading glasses and for many other purposes, as will be evident.

I have embodied the invention in a preferred form thereof which is illustrated in the accompanying drawings together with modifications thereof, in which:

Fig. 1 is a top plan view of the invention;

Fig. 2 is a side elevation thereof;

Fig. 3 is a front elevation of the main lens structure, with parts in section, and viewed on the line 3—3 of Fig. 1.

Fig. 4 is a top plan view of the binoculars in folded position;

Fig. 5 is a longitudinal sectional view through one of the temples, showing the slidable and pivotal connections thereof;

Fig. 6 is a partial disassembled perspective view of the temple connections;

Fig. 7 is a transverse sectional view through one of the temples on the line 7—7 of Fig. 5;

Fig. 8 is a similar view showing a modified form thereof;

Fig. 9 is a similar view showing still another form thereof;

Fig. 10 is a detail perspective view showing a portion of color glass and its attaching hook; and Fig. 11 is a detail front elevation of a modified form of lens mounting.

The invention is shown as utilizing a pair of main lenses 1 which are connected together by a conventional form of bridge 2 adapted to fit over the nose and to rest thereon during use of the binoculars so as to position the lenses directly in front of the respective eyes of the user.

Coacting with the lenses 1 are secondary lenses 3 adapted to be supported and adjusted in front of the lenses 1 to the proper and desired focal length for viewing objects therethrough in a manner customary in the use of binoculars or field glasses, as well as for folding up into compact shape when not in use in the manner shown in Fig. 4.

To provide for the supporting and adjusting of the respective pairs of lenses 1 and 3, the main lenses 1 are supported by a pair of temples 4 which are connected respectively with the lenses 1 through hinges 5. Each temple 4 is provided with bifurcations 6 on the end thereof, as shown in Figs. 5 and 6, which overlap ears 7 on a bracket 8 of the hinge 5, and are pivotally connected therewith by pins 9, which pins 9 are turned over substantially as rivets, as shown in Fig. 5, leaving the space therebetween open and free.

Each of the temples 4 is hollow at 10 and slidably receives therein a side bar 11 which telescopes with the temple, as shown in Fig. 5. The bar 11 has a pin 12 secured thereto extending laterally through a slot 13 in a side of the hollow temple 4 to limit the sliding movement of the bar in opposite directions relative to the temple. A tightening nut 14 is threaded on the pin 12 to secure the parts in any desired adjusted position. At their forward ends, the rods 11 are pivotally connected at 15 with arms 16 of a frame 17 carrying the lenses 3.

It will be evident that the temples 4 provide supports for holding the lenses 1 and 3 in their proper positions on the head of the wearer, while allowing adjustment to different relative positions, as desired, and to bring the lenses into proper focus with each other. By loosening the tightening nuts 14, the rods 11 may be slid into the hollows 10 of the temples until the pivots 15 are in axial alignment with the pivot pins 9, permitting swinging movement of the temples with the rods 11 about these pivots to fold the temples to the positions shown in Fig. 4. This disposes the lenses 3 close to the lenses 1 in compact arrangement, permitting the carrying of the parts in the pocket or in a relatively small space or case ready for immediate use when desired. The binoculars may be made ready for use merely by opening the temples and sliding out the side bars 11 to bring the lenses 3 into the proper adjusted positions and in focus with the lenses 1.

When the binoculars or field glasses are used in strong light, a shilding effect may be obtained by the use of plain slightly tinted or colored glasses or lenses 18 which are connected together by a frame 18' as a unit, and which frame is adapted to be applied to the binoculars or readily removed therefrom. For this purpose, the opposite ends of the frames are provided with brackets 19, as shown in Fig. 10, each bracket having a hook 20 to engage over the side bar 11, and a hook 21 at right angles thereto in position to engage around an edge of the adjacent lens 1 for removably attaching the auxiliary glasses 18 thereto.

Although each temple 4 is shown as constructed of cylindrical form in Figs. 5 to 7, these parts may be of other shapes, such as square, as designated at 4a in Fig. 8, or formed of sheet metal folded transversely upon itself providing a guideway as designated 4b in Fig. 9 and receiving therein a slide or side bar 11b for adjustably supporting the front lenses, as described above.

Instead of attaching the temples directly to the lenses 1, they may be connected with frames as shown at 23 in Fig. 11, which frames support small lenses 24 therein and spaced therefrom to provide open spaces through which the user may view objects without looking through the lenses, and yet the lenses are sufficiently large for effective use.

These binoculars or field glasses may be used wherever it is desired to obtain clearer vision or to view objects at a distance, and may be readily applied or removed when desired.

In place of the temples for securing the binoculars to the head, they may be attached to a band extending therearound, as desired.

I claim:

1. In a pair of binoculars, the combination of a pair of main lenses having a bridge connecting the same together, each of said main lenses having a pair of spaced ears projecting outwardly therefrom, temples each having a bifurcated end with the bifurcations thereof pivoted to the spaced ears respectively, auxiliary lenses, and side bars pivotally connected with the auxiliary lenses and telescopically connected with the temples between the pivoted ears and bifurcations for adjustment toward and from the main lenses.

2. In a pair of binoculars, the combination of a pair of main lenses having a bridge connecting the same together, each of said main lenses having a pair of spaced ears projecting outwardly therefrom, temples each having a bifurcated end with the bifurcations thereof pivoted to the spaced ears respectively, auxiliary lenses, side bars pivotally connected with the auxiliary lenses and telescopically connected with the temples between the pivoted ears and bifurcations for adjustment toward and from the main lenses, and means for securing the side bars in adjusted positions relative to the temples.

3. In a pair of binoculars, the combination of a pair of main lenses having a bridge connecting the same together, temples pivotally connected with the respective main lenses, auxiliary lenses, side bars pivotally connected with the auxiliary lenses and connected with the temples, and a pair of shielding lenses connected together as a unit and having brackets provided with hooks for engaging around the main lenses for detachably securing said shielding lenses thereto, each of said brackets having a secondary hook extending approximately at right angles to the first-mentioned hook and engaging over the side bar for holding the shielding lenses in proper position relative thereto.

LOUIS H. REZOS.